United States Patent Office 3,062,211
Patented Nov. 6, 1962

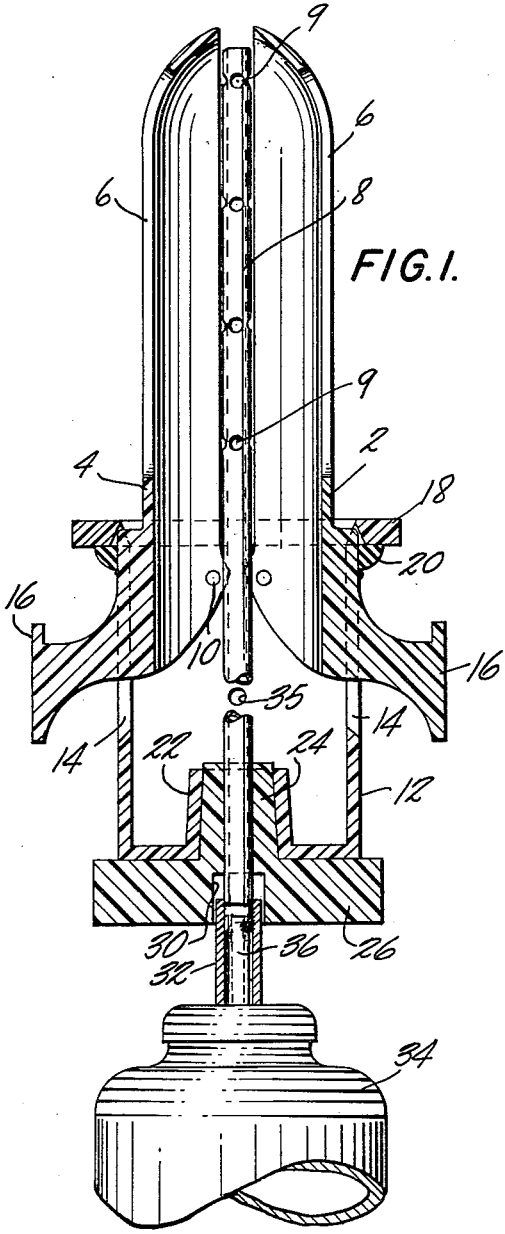
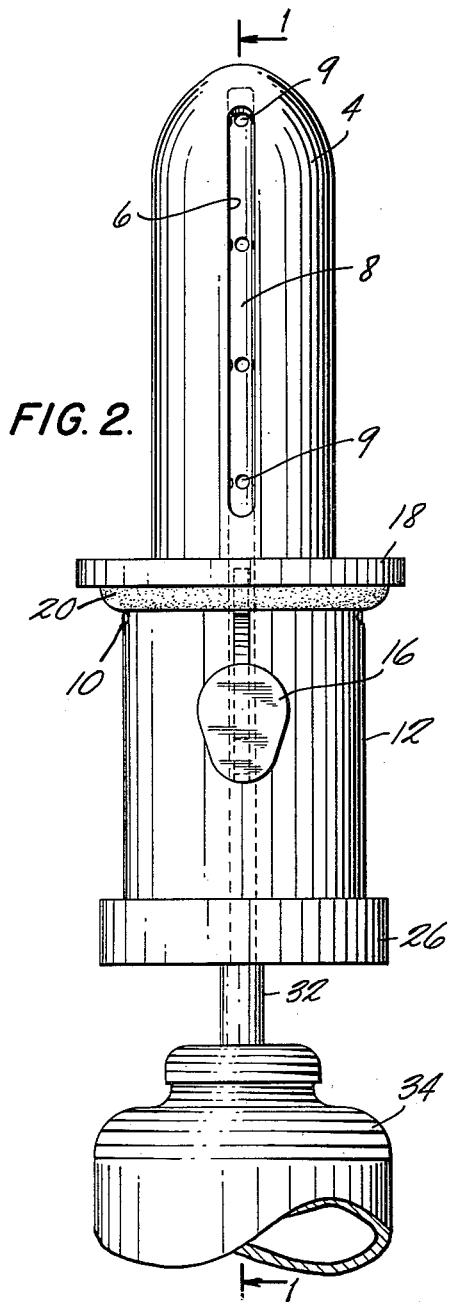

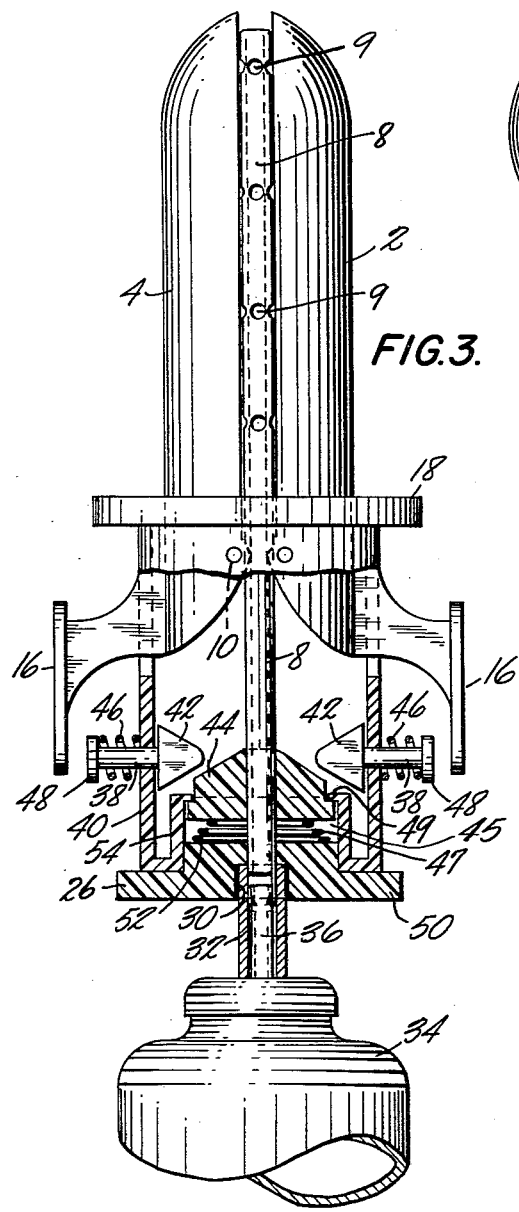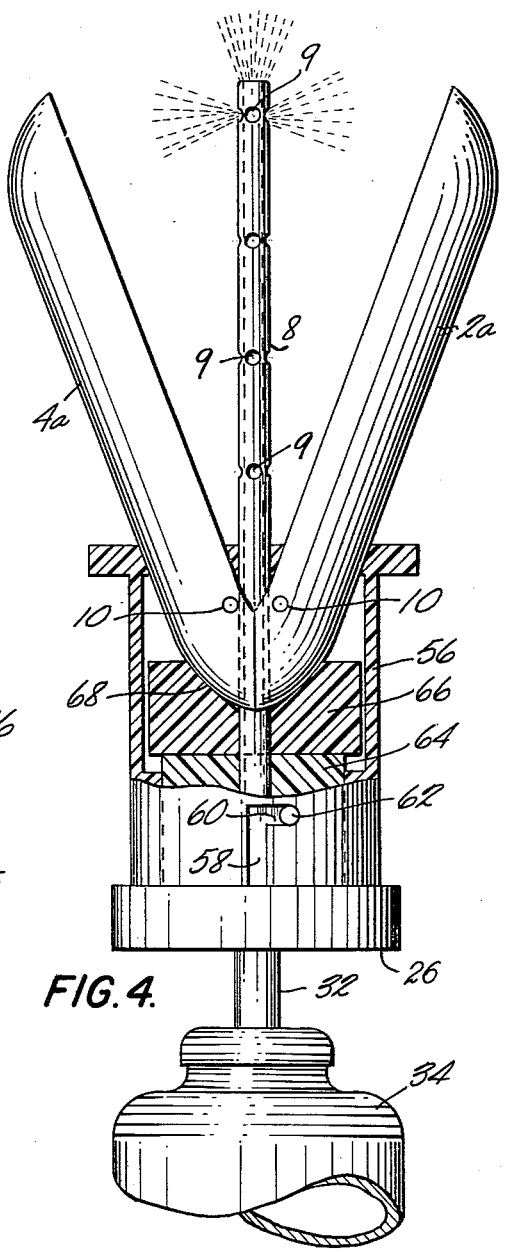

3,062,211
IRRIGATING OR SPRAYING DEVICES
Henry W. Walden, 124 W. 55th St., New York, N.Y., and Richard H. Walden, 31 Westgate Blvd., Plandome, N.Y.
Filed Sept. 3, 1958, Ser. No. 758,730
5 Claims. (Cl. 128—244)

The present invention relates to irrigation or spray devices such as are used for the injection and distribution of medicaments, antiseptics, cleansing preparations and other materials in liquid, mist, foam, stream, spray, jelly, powder or any other forms into body cavities. More particularly the invention comprises an improved device of this character particularly adapted for injection of material into the vagina. The new device is adapted for ready and simple self use, insures a uniform distribution of the material throughout the body cavity, may be readily dismantled for cleaning, and is designed for coupling to aerosol type medicament, therapeutic or cleansing material containers.

The new irrigation device comprises in general a pair of pivoted members which in closed position form a somewhat tubular enclosure for ready introduction into the body cavity much as a speculum and which after introduction may be separated to dilate the cavity. The pivoted members may be solid walled for some applications, such as for administration of contraceptives, or are provided with openings therethrough to insure thorough distribution of the medicament or other material to the walls of the cavity. Means, readily operable by the user, are provided for spreading the pivoted members after introduction into the body cavity. In two embodiments of the invention the manipulation of the last mentioned means serves also to release the supply of medicament or other material for introduction into the cavity. A tubular member provided with spray openings extends into the space between the pivoted members and at its lower end is positioned for abutment with the valve stem of an aerosol type container. The lower end of the tubular member is mounted in a base which may be press fit to the support means for the pivoted arms, permitting removal of the base for complete cleaning of the interior of the device and of the tubular member.

The device preferably is formed entirely of plastic material, such as a thermoplastic or thermoset synthetic resin or cellulose derivative, such as polyethylene or cellulose acetate.

For a better understanding of the invention and of specific embodiments thereof, reference may be had to the accompanying drawings of which—

FIG. 1 is a vertical sectional view of an irrigation device embodying the invention, and taken on the line 1—1 of FIG. 2, FIG. 2 is a side elevation of the device of FIG. 1 taken at right angles thereto, FIG. 3 is a side view, partly in vertical section, of an irrigation device representing an alternative construction, and FIG. 4 is a side view, partly in vertical section, representing still another embodiment of the invention, the device being shown in operative position.

The device of FIGS. 1 and 2 includes two pivoted arms or jaws 2 and 4 which when closed as shown in the drawing define a tubular enclosure having a smoothly rounded end. In each jaw is a longitudinal slot 6 and within the enclosure defined by the jaws is a supply tube 8 having one or a plurality of spray openings 9 at the upper end thereof. Only one opening, the end of the tube itself, is neeeded when the device is used for contraception. The jaws 2 and 4 are pivotally mounted at 10 on the inside of the wall of a cylindrical casing member 12 by means of a raised portion on the jaws centered on corresponding depressions or holes provided on casing 12. The casing 12 has side openings 14 therein through which extend the lower spreading ends of the jaws 2 and 4. These ends terminate in button finger pieces 16 which when pressed toward each other open the jaws. Preferably, as indicated in the drawing, the jaws 2 and 4 together with their lower extensions terminating in the buttons 16 are of plastic material. An annular member 18, preferably also of plastic material, surrounds the jaws 2 and 4 above the level of the rods 10 to serve as a stop limiting the extent of penetration into the body cavity. Beneath the annular member 18 is a rubber ring 20 which tends to return the jaws 2 and 4 to the closed position after separation through pressure on the buttons 16. This rubber ring is not essential, and may be omitted, because it is a simple matter to press the jaws together upon entry into the body cavity.

The lower wall of the casing 12 is provided with a reentrant tubular portion 22 for reception of a hub 24 formed on a base 26. The hub 24 has a central passage therethrough for reception of the lower end of the tubular member 8 and the under surface of the base 26 is centrally recessed at 30, the lower end of the tube 8 extending into the recess 30. The recess 30 provides a clearance about the lower end of the tube 8 so that a tubular coupling 32 attached to a container 34 may be inserted into the recess about the projecting end of the tube 8. With this arrangement a container 34 of the aerosol type (shown in FIG. 1 positioned for insertion into the recess) and having within the coupling 32 a plunger 36 for operation of the conventional pressure-responsive container valve (not shown) may be inserted with the coupling within the recess for release of the contents of the container 34 upon engagement of the plunger 36 with the tube 8. One or more air vents 35 are provided in the wall of casing 12.

The operation of the above described device will be relatively clear from the foregoing description. When the device is to be used, the jaws 2 and 4, in the closed position illustrated in the drawing, are inserted into the vagina or other body cavity. The user then presses the buttons 16 toward each other to cause opening of the jaws, and with the other hand pushes the container 34 toward the base 26 to bring the plunger 36 into engagement with the lower end of the tube 8. This releases the flow of material from the container 34 into the tube 8 and from the tube 8 through the spray nozzles 9 into the body cavity. The provision of the slots 6 in the sides of the jaws 2 and 4 insures that the material will flow in the desired direction from the spray nozzles to reach and cover the cervix and adjoining portions or all sides of the cavity. Additional spray nozzles could of course be provided along the length of the tube 8, and additional slots or other openings could be provided in the jaws 2 and 4. Alternatively the jaws could be perforated throughout their extent, or made of openwork gauze-like material.

The device may be readily dismantled for cleaning as the base 26 carrying the hub 24 may be pulled out from the base of the casing 12, permitting access to the entire interior of the device, and facilitating the cleaning of the tube 8.

In the embodiment of the invention illustrated in FIG. 3, to which reference may now be had, a single manipulation by the user serves both to open the jaws and to start the flow of material from the supply container. In this embodiment of the invention the jaws may be constructed and mounted as in the embodiment of FIGS. 1 and 2 and therefore the same reference numerals have been applied thereto. Two reciprocal rods 38 are mounted in opposite side walls of a cylindrical casing 40 and on the inner end of each rod is mounted a cam element 42 adapted, when moved inwardly, to bear against the sloping upper surface of a plunger 44 secured to the tube 8. A compression spring 46 is mounted on each rod 38 to bias the cam 42 out of engagement with the plunger 44. The plunger in turn is slidably mounted in a recess 45 in the upper portion of the base 26, biased towards the end of the recess by the springs 47. Lug 49 prevents the plunger from escaping from the recess. The outer end of each rod 38 carries a button 48 positioned in the line of movement of the button 16 of the jaws. With this arrangement, when the jaws are opened by pressure upon the buttons 16, the cam elements 42 move inwardly to engage and depress the plunger 44 against the springs 47, and with it the tube 8. This brings the tube 8 into engagement with the valve plunger 36 of the supply container 34 and therefore automatically insures delivery of the material upon opening of the arms. As in the embodiment of the invention of FIGS. 1 and 2, the base member 50 has a hub 52 thereon which is press fit into a reentrant cylindrical portion 54 in the base of the cylindrical member 40 to permit removal for cleaning of the interior of the device. In this embodiment of the invention the coupling tube 32 is of a length to maintain a slight clearance between tube 8 and plunger 36 when the jaws are closed.

In the embodiment of the invention illustrated in FIG. 4, the jaws 2a and 4a are opened by cam operation. As in the other embodiments of the invention the jaws are pivotally mounted in a tubular casing 56. The casing 56 is provided with a vertical slot 58, the upper end of which communicates with a horizontal slot 60, the two slots 58 and 60 forming a guideway for a pin 62 which is carried by a drum 64, the drum 64 being fixed to the tube 8 and being rotatable within the casing 56. Also riding on the drum 64 is a cylindrical block 66 having and upper curved cam surface 68 adapted to engage the under surface of the jaws 2a and 4a when the drum is moved upwardly into the position shown in FIG. 4. The surface 68 is shaped to pivot the jaws to the open position upon such engagement. Release of the contents of the container 34 can be effected by engagement between the valve plunger of the supply container 34 and the lower end of the tube 8, as in the other embodiments of the invention, but in this case engagement is made within the passage through the drum 64. Release can also be made to respond to manual pressure by fitting a valve responsive to sidewise movement of the container valve stem against the drum 64. In this event the coupling 32 is so made as to permit lateral movement of the valve stem by manipulating the container. As valves responsive to sidewise movement or to vertical movement are well known in this art, it has not been deemed necessary to illustrate valves for specific use in the construction of FIG. 4.

In operation of the device, when the pin 62 has been lifted to the level indicated in the drawing, the casing 56 is rotated to receive the pin 62 into the slot 60. This locks the parts in operative position with the jaws 2a and 4a open and then the valve of container 34 is opened for delivery of material into tube 8 and through the nozzles 9. When delivery of material is stopped, the casing 56 is rotated in the opposite direction to bring the pin 62 to the upper end of the passage 58. The drum 64 and attached tube 8 and container 34 are then removed, releasing member 66 from engagement and permitting the jaws 2a and 4a to be closed by engagement with the body orifice during withdrawal, the block 66 moving readily away from the lower end of the jaws upon removal of the drum 64. Complete withdrawal of tube 8 with drum 64 facilitates cleaning of the device and of the tube.

Specific embodiments of the invention have now been illustrated and described. Obviously, various changes could be made in the specific constructions illustrated without departing from the spirit of the invention or the scope of the accompanying claims.

The irrigating device of the invention can be used with a variety of medicaments, and these, as indicated, can be in the form of dry powders or jellies, creams or liquids, or aerosol mists, foams and sprays.

A particularly desirable form of medicament is a liquid solution packed under pressure with a gas, such as nitrogen or a hydrocarbon such as propane, isobutane, butane and cyclobutane, which, upon shaking forms a foam with the liquid and causes the contents of the container to be emitted as a foam, or such as the chlorofluorinated hydrocarbons, such as the Freons, such as Freon 12, $CF_2Cl_2$, Freon 13, $CF_3Cl_1$, Freon 113, $C_2F_3Cl_3$, Freon 114, $C_2F_4Cl_2$ or Freon 115, $C_2F_5Cl$, and analogous gases, which form an emulsion, suspension or solution emitted under pressure as a foam when the container valve is released.

In many cases a sufficient foam is obtainable from the gas alone. When this is insufficient, however, or when a very large volume is needed, the foam volume can be increased by incorporating in the composition a foam-enhancing agent. The amount of the foam-enhancing agent is not critical. Usually a small amount is sufficient, within the range from 0.025 to about 15%.

Nonirritating neutral soaps are excellent inexpensive foam-enhancing agents. Alkali metal salts of fatty acids having from eight to twenty-four carbon atoms such as the sodium salts of tallow fatty acids, the sodium salts of coconut oil fatty acids, sodium palmitate, sodium stearate, potassium stearate, sodium oleate, ammonium stearate, potassium oleate, potassium laurate and potassium myristate, are exemplary. Shaving soaps are excellent foam-enhancing agents because they produce thick cream lathers; such soaps normally contain a high percentage of potassium stearate, sodium coconut oil and sodium tallow soaps. A small amount of the stearic acid may be left as free acid and there also can be emollients and the like as is well known.

There can also be used suds boosters of the type incorporated in synthetic detergent compositions, such as the alkanolamides of fatty acids having from twelve to eighteen carbon atoms and having an alkylol radical of from one to four carbon atoms and one, two or three hydroxyl groups, for example, palmitic ethanolamide, lauric ethanolamide and lauric isopropanolamide.

The following are examples of compositions which can be employed in conjunction with the irrigating device of the invention.

*Example 1*

A jelly composed of:
0.1% gentian violet
3% lactic acid
1% acetic acid
10% mixture of 20% Freon 12 and 80% Freon 114
Remainder 15% aqueous shaving soap concentrate.

This composition is useful for vaginal therapeutic treatment.

*Example 2*

A cream composed of:
0.5% ricinoleic acid
0.1% hexaresorcinol
0.0077% chlorothymol
In a base of: sodium benzoate, glycerine, and gum tragacanth
10% mixture of 20% Freon 12 and 80% Freon 114
Remainder 15% aqueous shaving soap concentrate.

This composition is useful for vaginal therapeutic treatment and contraception.

Example 3

40 g. of a jelly composed of:

- 0.3% mono-isooctylphenyl ether of polyethylene glycol
- 0.05% methyl paraben
- 3% sodium borate in jelly base, pH 7.5

10 g. 15% aqueous shaving soap concentrate
10 g. mixture of 20% Freon 12 and 80% 114.

This composition is useful for vaginal therapeutic treatment and contraception.

The Freon shown in these examples gives satisfactory results, but any of the Freons mentioned above and mixtures thereof in any desired proportions can be substituted.

It is apparent that the liquid solvent or suspending medium can be water or an inert organic solvent, which contains the desired concentration of the medicament.

All of the above proportions are percent by weight of the composition.

Because of the novel construction wherein access for cleaning is provided, the device also lends itself to use with powdery materials, such as furazolidone or other therapeutic powders. In conventional prior art injecting devices the difficulty of thorough cleaning of the devices has made them unsuitable for use in injection of powdery materials. Preferably, when the material is in powdered form the jaws, as heretofore suggested, will be perforated to provide a multiplicity of ports for delivery of the powder therethrough. It will be apparent that the invention comprises a readily manipulatable device and one that can be readily coupled to aerosol type containers. By providing the tubular coupling between such type container and the new device the user is protected from inadvertent application of improper material from another container as might occur should a universal type attachment be provided.

This application is a continuation-in-part of copending applications Serial Nos. 653,462, now Patent No. 2,924,218 and 708,674.

We claim:

1. A speculum comprising, in combination, a casing member, a pair of jaws pivotally mounted thereon, at one end thereof, which when closed define an extension of the casing member, a dispensing tube projecting from the casing and enclosed at least partially by the jaws, manually operable means for pivoting said jaws after introduction thereof into a body cavity, the other end of the casing having a reentrant portion, a removable closure seating with said reentrant portion by a press fit, closing off that end of the casing member, the closure having an aperture therethrough, and a portion of the closure extending beyond the casing for facilitating manual removal thereof from the casing, the dispensing tube being attached to the closure, adjacent the inner end of the aperture and removable therewith, and socket means adapted to receive the valve-controlled plunger of an aerosol-type supply container at the outer end of the aperture and connecting with the dispensing tube.

2. A speculum in accordance with claim 1 in which the manually operable means for pivoting the jaws comprise outwardly extending wing sections terminating in button finger pieces.

3. A speculum in accordance with claim 1 in which the manually operable means comprises an element slidably mounted on the dispensing tube and having a cam-shaped surface at one end adapted to engage the jaws adjacent their pivotal mounting to bring them into open position, and engaging the closure at the other end, whereby moving the closure toward the element brings the cam surface into engagement with the jaws.

4. A speculum in accordance with claim 1 wherein the dispensing tube has a plunger element mounted thereon and wherein the casing carries reciprocable elements adapted by movement of the button finger pieces towards jaw-open position for moving the reciprocable elements to be moved in one direction and to engage and move the plunger element and dispensing tube in a direction to cause the end of the dispensing tube to move into engagement with a valve controlled plunger of an aerosol-type container inserted in said aperture, whereby pressure on said button finger pieces opens the jaws and causes material from the container to be delivered to said dispensing tube.

5. A speculum in accordance with claim 3 including means for locking the closure in jaw-open position.

References Cited in the file of this patent

UNITED STATES PATENTS

| | | |
|---|---|---|
| 1,034,818 | Mulgrew | Aug. 6, 1912 |
| 1,076,221 | Miner | Oct. 21, 1913 |
| 1,202,193 | Kruger | Oct. 24, 1916 |
| 1,697,834 | McArthur | Jan. 1, 1929 |
| 2,380,459 | Grosso | Feb. 27, 1945 |
| 2,512,434 | Leu | June 20, 1950 |
| 2,782,975 | Bird | Feb. 26, 1957 |
| 2,802,772 | Elder | Aug. 13, 1957 |
| 2,854,377 | Elias | Sept. 30, 1958 |

UNITED STATES PATENT OFFICE
CERTIFICATE OF CORRECTION

Patent No. 3,062,211　　　　　　　　　　　　　　November 6, 1962

Henry W. Walden et al.

It is hereby certified that error appears in the above numbered patent requiring correction and that the said Letters Patent should read as corrected below.

Column 3, line 6, for "wtih" read -- with --; column 6, line 46, for "2,380,459" read -- 2,370,459 --.

Signed and sealed this 18th day of June 1963.

(SEAL)
Attest:

ERNEST W. SWIDER
Attesting Officer

DAVID L. LADD
Commissioner of Patents